US012281592B2

(12) United States Patent
Park et al.

(10) Patent No.: US 12,281,592 B2
(45) Date of Patent: Apr. 22, 2025

(54) ROTOR ASSEMBLY HAVING PROTECTIVE CORE AND GAS TURBINE ENGINE COMPRISING SAME

(71) Applicant: HANWHA AEROSPACE CO., LTD., Changwon-si (KR)

(72) Inventors: Seung Hwan Park, Changwon-si (KR); Myung Sook Son, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 0 days.

(21) Appl. No.: 18/719,484

(22) PCT Filed: Feb. 15, 2022

(86) PCT No.: PCT/KR2022/002219
§ 371 (c)(1),
(2) Date: Jun. 13, 2024

(87) PCT Pub. No.: WO2023/113102
PCT Pub. Date: Jun. 22, 2023

(65) Prior Publication Data

US 2025/0052159 A1 Feb. 13, 2025

(30) Foreign Application Priority Data

Dec. 16, 2021 (KR) ........................ 10-2021-0180856

(51) Int. Cl.
*F01D 5/02* (2006.01)
*F01D 5/10* (2006.01)
*F01D 5/30* (2006.01)

(52) U.S. Cl.
CPC ............... *F01D 5/027* (2013.01); *F01D 5/10* (2013.01); *F01D 5/3007* (2013.01); (Continued)

(58) Field of Classification Search
CPC ...... F01D 5/3092; F01D 5/027; F01D 5/3007; F01D 5/10; F01D 5/16; F01D 5/26; (Continued)

(56) References Cited

U.S. PATENT DOCUMENTS 4,477,226 A * 10/1984 Carreno .................. F01D 5/027 416/500
5,240,375 A * 8/1993 Wayte ................... F01D 5/3092 416/248
(Continued)

FOREIGN PATENT DOCUMENTS

| | | |
|---|---|---|
| EP | 0 699 824 B1 | 1/1998 |
| EP | 1 130 217 B1 | 5/2005 |

(Continued)

OTHER PUBLICATIONS

International Search Report (PCT/ISA/210) issued on Aug. 31, 2022 by the International Searching Authority in International Application No. PCT/KR2022/002219.
(Continued)

*Primary Examiner* — Mark A Laurenzi
*Assistant Examiner* — Xiaoting Hu
(74) *Attorney, Agent, or Firm* — Sughrue Mion, PLLC

(57) ABSTRACT

The present disclosure relates to a rotor assembly including a protective core. The rotor assembly according to an embodiment of the present disclosure includes a disk that is inserted into a rotating shaft and has a plurality of seating grooves in a circumferential direction thereof, a plurality of blades inserted into the seating grooves, respectively, and a protective core which is arranged between the blades and the disk, has a plurality of mounting portions on one surface thereof, and includes a plurality of weights that are attachable to and detachable from the mounting portions.

14 Claims, 11 Drawing Sheets

(52) U.S. Cl.
CPC ........ *F01D 5/3092* (2013.01); *F05D 2220/32* (2013.01); *F05D 2240/24* (2013.01); *F05D 2260/96* (2013.01)

(58) Field of Classification Search
CPC ...... F01D 25/04; F01D 25/06; F05D 2260/96; F04D 29/662
See application file for complete search history.

(56) References Cited

U.S. PATENT DOCUMENTS

| | | | | | |
|---|---|---|---|---|---|
| 5,584,659 | A * | 12/1996 | Schmidt | F01D 5/323 416/221 |
| 6,190,131 | B1 * | 2/2001 | Deallenbach | F01D 5/027 416/193 A |
| 6,431,835 | B1 * | 8/2002 | Kolodziej | F01D 5/28 416/248 |
| 6,481,969 | B2 * | 11/2002 | Berry | F01D 5/027 416/500 |
| 8,529,209 | B2 * | 9/2013 | Belmonte | F04D 29/668 416/221 |
| 8,974,185 | B2 * | 3/2015 | Franks | F01D 5/3007 416/144 |
| 9,103,220 | B2 * | 8/2015 | Garin | F01D 5/3092 |
| 2003/0194321 | A1 | 10/2003 | Barnette et al. | |
| 2009/0010762 | A1 * | 1/2009 | Caucheteux | F01D 5/22 416/189 |
| 2010/0080689 | A1 * | 4/2010 | Lee | F01D 5/027 415/119 |
| 2010/0278634 | A1 * | 11/2010 | Koza | F01D 5/027 415/119 |
| 2014/0161617 | A1 | 6/2014 | Chatenet et al. | |
| 2014/0178202 | A1 | 6/2014 | Chatenet et al. | |
| 2014/0234117 | A1 * | 8/2014 | Cairo | C04B 35/565 29/889.7 |
| 2016/0237825 | A1 * | 8/2016 | Himes | F01D 5/027 |
| 2016/0333889 | A1 | 11/2016 | Kray et al. | |
| 2020/0340364 | A1 * | 10/2020 | Starr | F01D 5/3007 |

FOREIGN PATENT DOCUMENTS

| | | | | |
|---|---|---|---|---|
| EP | 1 443 180 | B1 | 10/2008 | |
| EP | 2 386 721 | A1 | 11/2011 | |
| GB | 2105790 | A * | 3/1983 | F01D 5/027 |
| KR | 10-2014-0038268 | A | 3/2014 | |
| KR | 20140038268 | A * | 3/2014 | |
| KR | 10-2017-0083836 | A | 7/2017 | |
| KR | 10-2021-0090941 | A | 7/2021 | |

OTHER PUBLICATIONS

Written Opinion (PCT/ISA/237) issued on Aug. 31, 2022 by the International Searching Authority in International Application No. PCT/KR2022/002219.
European Extended Search Report issued Mar. 10, 2025 by the European Patent Office for EP Patent Application No. 22907575.9.

* cited by examiner

ROTOR ASSEMBLY HAVING PROTECTIVE CORE AND GAS TURBINE ENGINE COMPRISING SAME

CROSS-REFERENCE TO RELATED APPLICATIONS

This application is a National Phase Entry of PCT International Application No. PCT/KR2022/002219 filed on Feb. 15, 2022, which claims priority to Korean Patent Application No. 10-2021-0180856 filed on Dec. 16, 2021, the contents of all of which are incorporated herein by reference in their entirety.

TECHNICAL FIELD

The present disclosure relates to a rotor assembly and a gas turbine engine, and more particularly, to a rotor assembly having a protective core and a gas turbine engine including the same.

BACKGROUND ART

Because a rotor assembly of a gas turbine engine rotates at high speed, the rotor assembly has a dovetail structure to prevent blades from being separated from a disk. Also, the blade is formed of a carbon fiber composite to reduce weight.

The blades formed of composite materials are vulnerable to delamination at a leading-edge area, caused by collision with external foreign substances and vibrations generated during operation. In particular, the dovetail structure has a high risk of damage due to direct contact with the disc during operation. Conventionally, to solve this problem, a wear strip is attached between the blade and the disk to prevent wear. However, because the wear strip is only partially placed in an area where the blade and the disk are in contact, a large stress is concentrated in that area during operation.

In addition, in general, after assembling a blade to a disk, a balancing work is performed to adjust the center of gravity. In this process, damage to the disk inevitably occurs while grinding the disk.

The above-described background technology is technical information that the inventor possessed for deriving the present disclosure or acquired in the process of deriving the present disclosure and may not necessarily be said to be known technology disclosed to the public prior to filing the application for the present disclosure.

DISCLOSURE

Technical Problem

The present disclosure is to solve the above-mentioned problems and provides a rotor assembly that prevents damage to blades, reduces manufacturing tolerances, and does not require unnecessary balancing work by placing a weight-adjustable protective core between the blades and a disk, and a gas turbine engine including the rotor assembly.

However, these problems are illustrative, and the problems to be solved by the present disclosure are not limited thereto.

Technical Solution

A rotor assembly according to an embodiment of the present disclosure includes a disk inserted into a rotating shaft and having a plurality of seating grooves in a circumferential direction, a plurality of blades inserted into the plurality of seating grooves, and a protective core disposed between the plurality of blades and the disk, having a plurality of mounting portions on one surface, and having a plurality of weights that are attachable to and detachable from the plurality of mounting portions.

In the rotor assembly according to an embodiment of the present disclosure, the plurality of mounting portions may be formed on a bottom surface of the protective core and may have cross-sectional areas that decrease outwardly in a radial direction of the disk.

In the rotor assembly according to an embodiment of the present disclosure, each of the plurality of mounting portions may be configured of a plurality of grooves having different outer diameters and arranged to form a step difference in a height direction thereof.

In the rotor assembly according to an embodiment of the present disclosure, the plurality of mounting portions may be arranged at equal intervals to form a plurality of rows in a longitudinal direction thereof.

In the rotor assembly according to an embodiment of the present disclosure, the plurality of mounting portions may be disposed on a longitudinal center line and a width direction center line of the bottom surface of the protective core.

In the rotor assembly according to an embodiment of the present disclosure, each of the plurality of mounting portion may have a cone or pyramid shape.

In the rotor assembly according to an embodiment of the present disclosure, the plurality of weights may have different weights from each other.

In the rotor assembly according to an embodiment of the present disclosure, a bottom surface of the protective core may be in contact with an inner bottom surface of the disk, and portions extending from both sides of the bottom surface in a width direction may extend between the plurality of blades and the disk.

In the rotor assembly according to an embodiment of the present disclosure, each of the plurality of blades may include a wing portion extending in a longitudinal direction thereof, and a dovetail portion extending from the wing portion, inserted into an seating groove, and having a width greater than that of the wing portion, the protective core may include a pair of support surfaces extending obliquely toward an inner wall of the disk on both sides of the bottom surface in the width direction, and a lower end of the dovetail portion may be supported on the pair of support surfaces.

In the rotor assembly according to an embodiment of the present disclosure, each of the plurality of weights may include a body and a plurality of support protrusions that protrude from the body and are coupled to inner surfaces of the plurality of mounting portions.

In the rotor assembly according to an embodiment of the present disclosure, each of the plurality of mounting portions may have a slit shape formed on the bottom surface of the protective core, a pair of support protrusions of each of the plurality of weights may be coupled to a pair of inner surfaces of each of the plurality of mounting portions, and the body of each of the plurality of weights may be arranged to be spaced apart from an inner surface of each of the plurality of mounting portions.

In the rotor assembly according to an embodiment of the present disclosure, each of the plurality of weights may have a rectangular parallelepiped shape extending in a width direction of the disk.

In the rotor assembly according to an embodiment of the present disclosure, each of the plurality of mounting portions may have a hole shape formed on a bottom surface of the protective core, a pair of support protrusions of each of the plurality of weights may be coupled to a pair of inner surfaces of each of the plurality of mounting portions, and the body of each of the plurality of weights may be arranged to be spaced apart from an inner surface of each of the plurality of mounting portions.

In the rotor assembly according to an embodiment of the present disclosure, the plurality of mounting portions gradually may increase in size toward one side of the protective core in a longitudinal direction.

A gas turbine engine according to an embodiment of the present disclosure includes a compressor configured to compress a working fluid, a combustion chamber in which the compressed working fluid and fuel are burnt, and a turbine configured to generate power through an output shaft and including a plurality of rotor assemblies, wherein each of the plurality of rotor assemblies includes a disk inserted into a rotating shaft and having a plurality of seating grooves in a circumferential direction, a plurality of blades inserted into the plurality of seating grooves, and a protective core disposed between the blade and the disk, having a plurality of mounting portions on one surface, and having a plurality of weights detachable from the plurality of mounting portions.

Other aspects, features, and advantages other than those described above will become apparent from the detailed description, claims, and drawings for carrying out the present disclosure below.

Advantageous Effects

A rotor assembly according to an embodiment of the present disclosure may minimize damage to a disk and blades during operation by placing a protective core between the blade and the disk. Additionally, by attaching and detaching a weight to and from the protective core, a rotation axis of the rotor assembly and the center of gravity may be easily aligned without a grinding process of the disk.

BEST MODE

Figure 1:
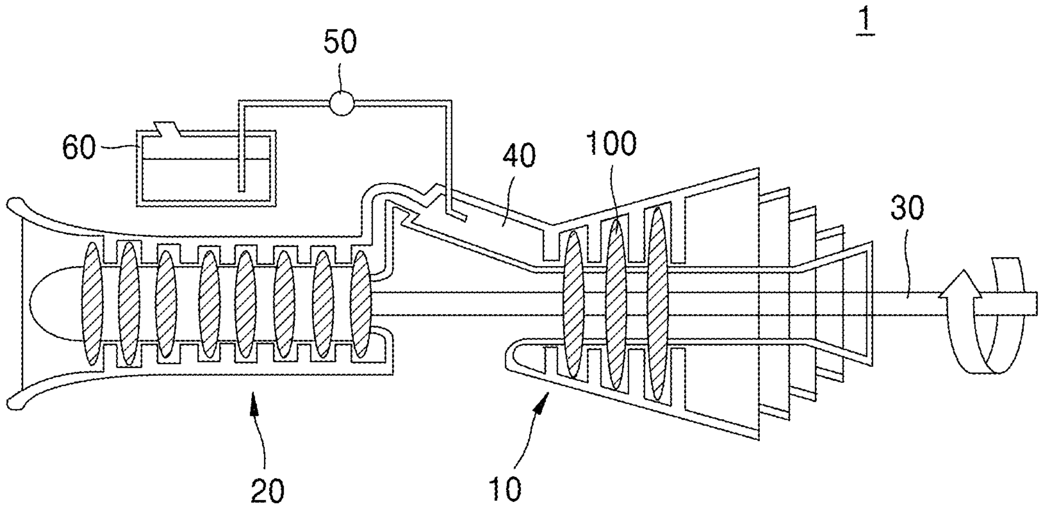
FIG. 1 shows a gas turbine engine according to an embodiment of the present disclosure.

A rotor assembly according to an embodiment of the present disclosure includes a disk that is inserted into a rotating shaft and has a plurality of seating grooves in a circumferential direction thereof, a plurality of blades inserted into the seating grooves, respectively, and a protective core which is arranged between the blades and the disk, has a plurality of mounting portions on one surface thereof, and includes a plurality of weights that are attachable to and detachable from the mounting portions.

MODE FOR INVENTION

As the present disclosure allows for various changes and numerous embodiments, particular embodiments will be illustrated in the drawings and described in detail in the written description However, this is not intended to limit the present disclosure to particular modes of practice, and it is to be appreciated that all changes, equivalents, and substitutes that do not depart from the spirit and technical scope are encompassed in the present disclosure. In describing the present disclosure, the same reference numbers are used for the same components even if they are shown in different embodiments.

Hereinafter, embodiments of the present disclosure will be described in detail with reference to the accompanying drawings, and when describing with reference to the drawings, identical or corresponding components will be assigned the same reference numerals and redundant description thereof will be omitted.

In the following embodiments, terms such as first and second are used not in a limiting sense but for the purpose of distinguishing one component from another component.

In the following embodiments, the singular forms are intended to include the plural forms as well, unless the context clearly indicates otherwise.

In the following embodiments, the terms "comprises" and/or "comprising," when used in this specification, specify the presence of stated features or constituent elements but do not preclude the presence or addition of one or more other features or constituent elements.

In the drawings, sizes of components may be exaggerated or reduced for convenience of explanation. For example, because sizes and thicknesses of components in the drawings are arbitrarily illustrated for convenience of explanation, the following embodiments are not limited thereto.

In the following embodiments, the x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

If a certain embodiment may be implemented differently, a specific process order may be performed differently from the described order. For example, two consecutively described processes may be performed substantially at the same time or performed in an order opposite to the described order.

Terms used in various embodiments of the present disclosure are only used to describe a specific embodiment and are not intended to limit various embodiments of the present disclosure. In this application, terms such as "include" or "have" are intended to designate that there are features, numbers, steps, operations, components, parts, or combinations thereof described in the specification, but it should be understood that it does not preclude the possibility of the presence or addition of one or more other features, numbers, steps, operations, components, parts, or combinations thereof.

Figure 2:
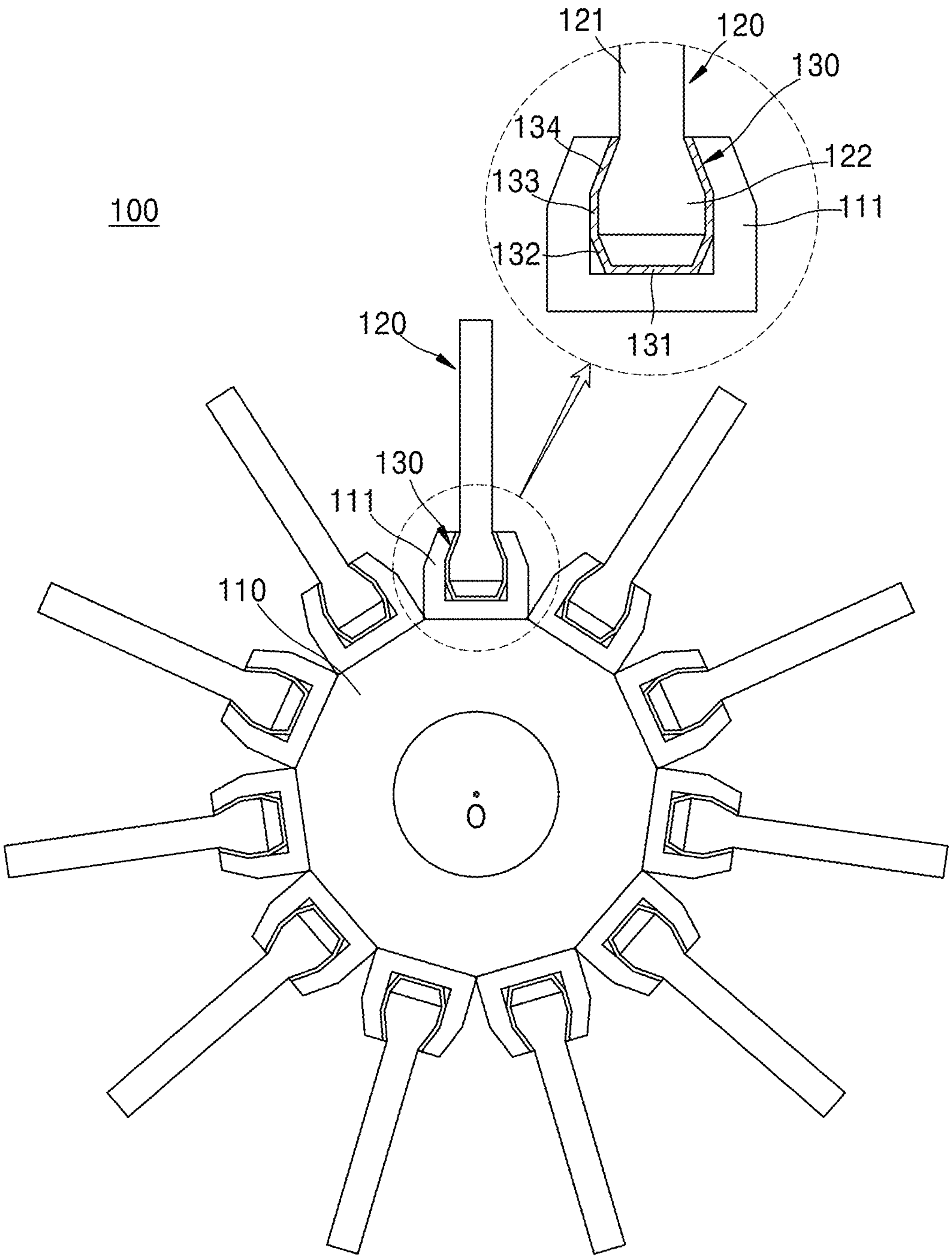
FIG. 2 shows a rotor assembly according to an embodiment of the present disclosure.
Figure 3:
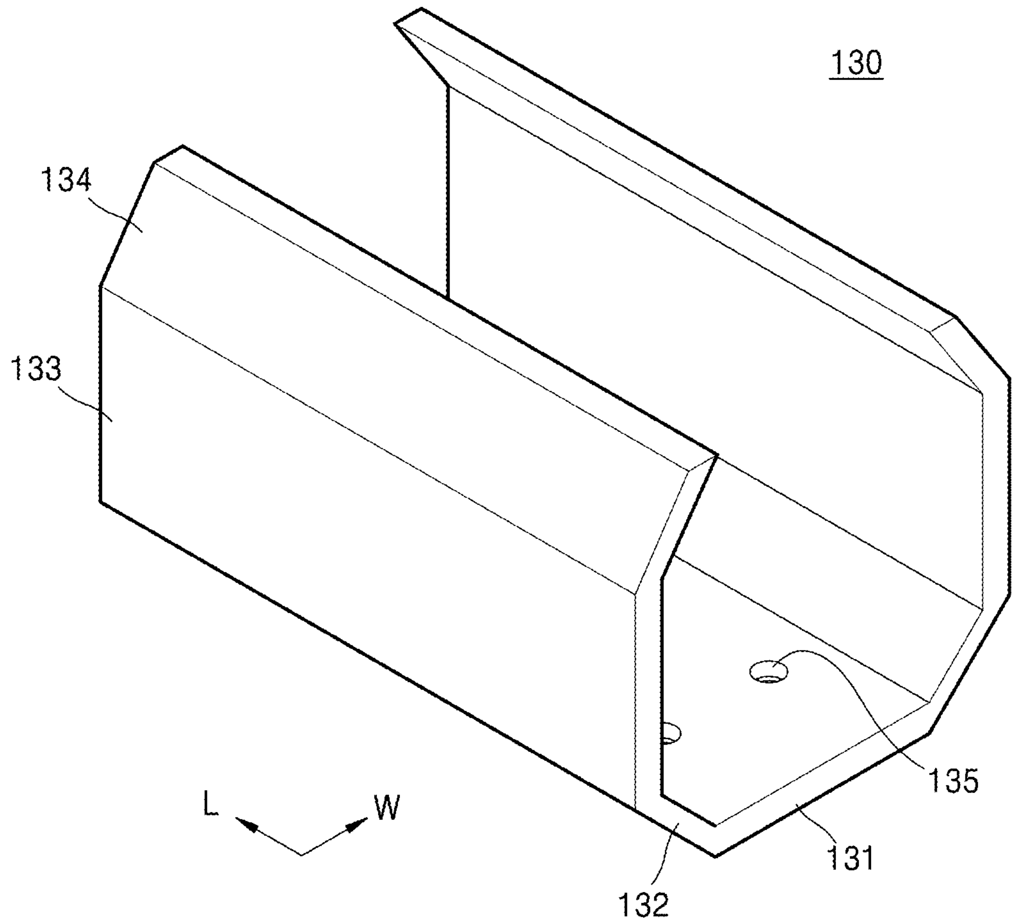
FIGS. 3 and 4 show a protective core according to an embodiment of the present disclosure.
Figure 4:
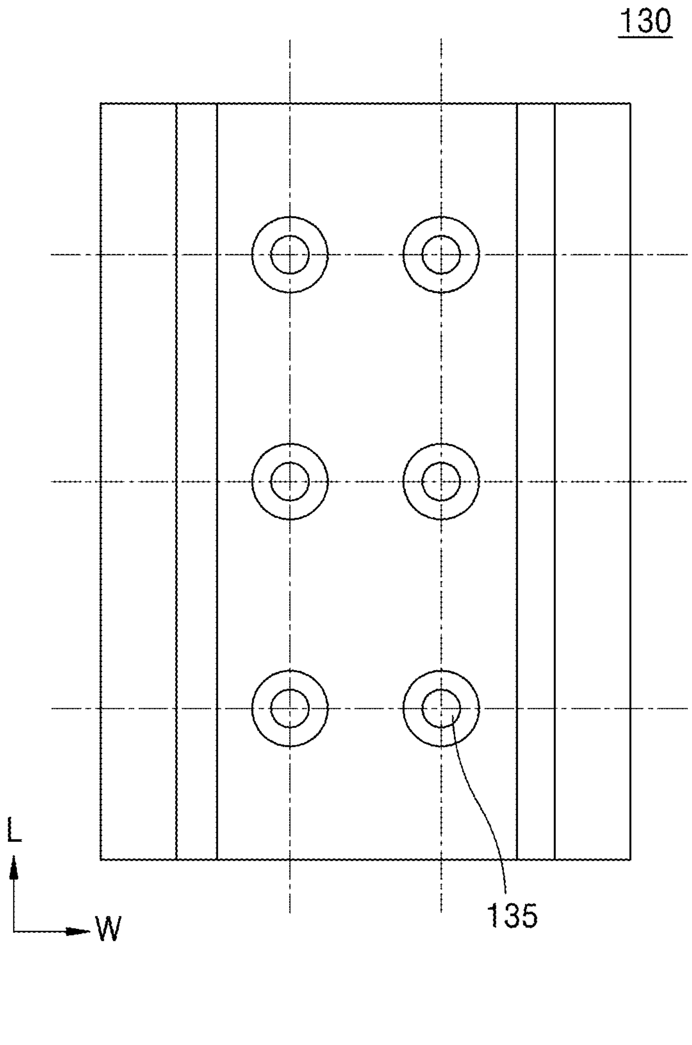
Figure 5:
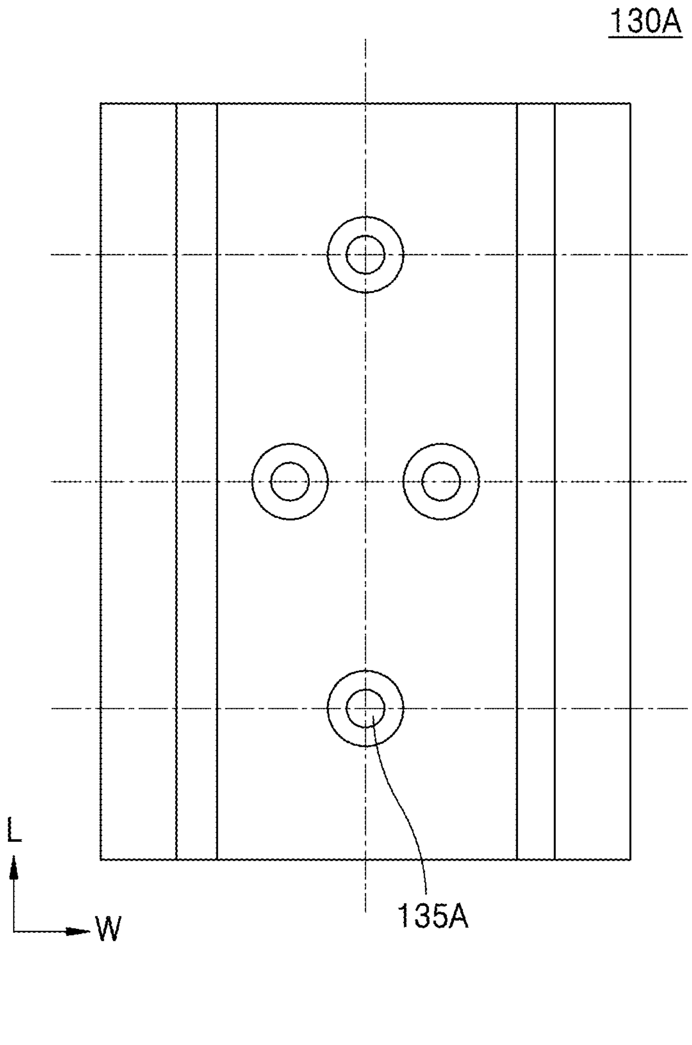
FIG. 5 shows a protective core according to another embodiment of the present disclosure.
Figure 6:
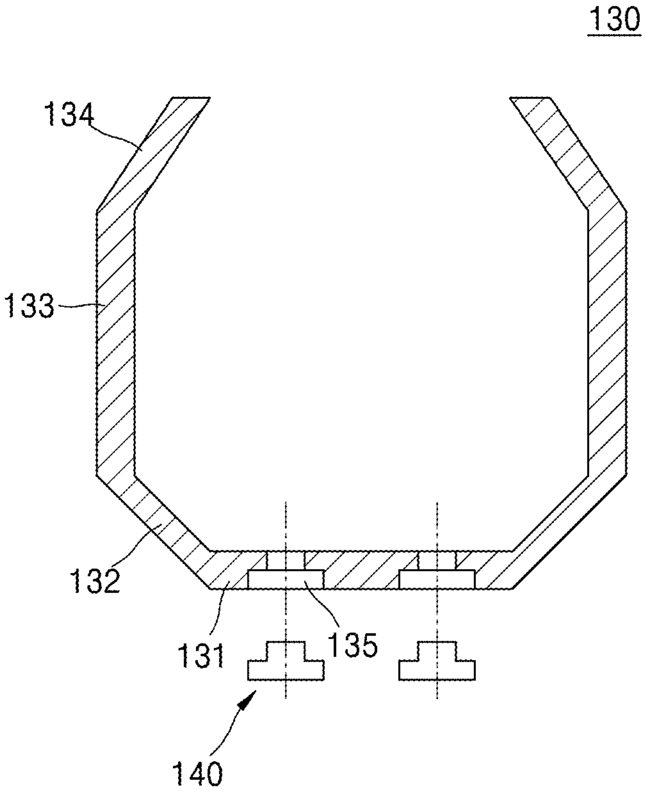
FIG. 6 shows a protective core and a weight according to an embodiment of the present disclosure.
Figure 7:
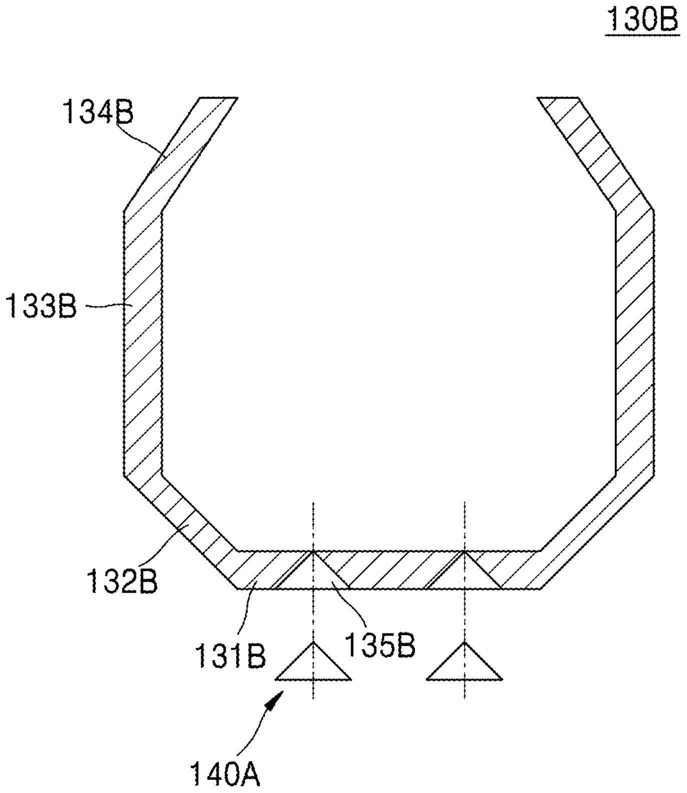
FIG. 7 shows a protective core and a weight according to another embodiment of the present disclosure.
Figure 8:
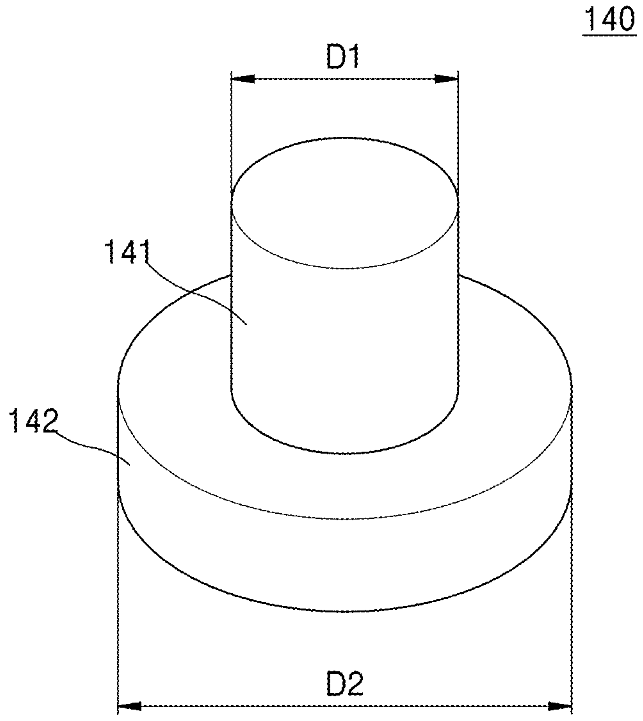
FIG. 8 shows a weight according to an embodiment of the present disclosure.
Figure 9:
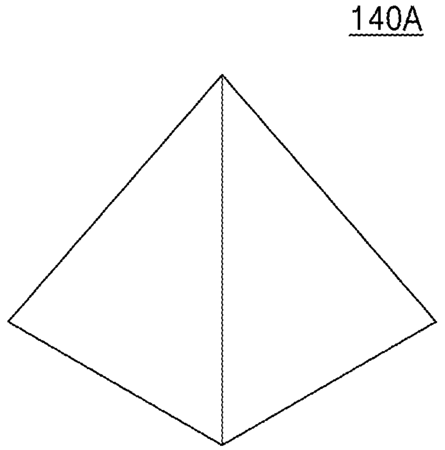
FIG. 9 shows a weight according to another embodiment of the present disclosure.

FIG. 1 shows a gas turbine engine 1 according to an embodiment of the present disclosure, FIG. 2 shows a rotor assembly 100 according to an embodiment of the present disclosure, FIGS. 3 and 4 show a protective core 130 according to an embodiment of the present disclosure, FIG. 5 shows the protection core 130A according to another embodiment of FIG. 6 shows the protection core 130 and the weight 140, FIG. 7 shows a protective core 130B and a weight 140A according to another embodiment of the present disclosure, and FIG. 8 shows a weight 140 according to an embodiment of the present disclosure, and FIG. 9 shows a weight 140A according to another embodiment of the present disclosure.

As shown in FIG. 1, the gas turbine engine 1 according to an embodiment of the present disclosure may include a turbine 10, a compressor 20, an output shaft 30, a combustion chamber 40, a pump 50, and a fuel tank 60. Air introduced into the compressor 20 is compressed and then burned in the combustion chamber 40 together with a fuel introduced through the fuel tank 60 and pump 50. A combustion gas passes through the turbine 10, generates output through the output shaft 30, and is exhausted to the outside. The gas turbine engine 1 may be used in aircraft, ships, power plants, etc.

The rotor assembly 100 may be included in the turbine 10. As shown in FIG. 1, a plurality of rotor assemblies 100 may be arranged in a direction of the output shaft 30 and may be arranged to rotate together with the output shaft 30. Also, as shown in FIG. 2, the rotor assembly 100 may include a disk 110, blades 120, and protective cores 130.

The disk 110 is inserted into the output shaft 30 and rotates together with the output shaft 30. The disk 110 may be inserted into the output shaft 30 so that the center O of the disk 110 is coaxial with the output shaft 30. The disk 110 may have a circular plate shape or a polygonal plate shape with a predetermined thickness. The disk 110 may be provided with a plurality of seating grooves 111 in a circumferential direction on the outer peripheral surface. More specifically, as shown in FIG. 2, the seating groove 111 is disposed on the outer peripheral surface of the disk 110, and a dovetail portion 122 of the blade 120 may be inserted into an inner surface of the seating groove 111. FIG. 2 shows that 11 seating grooves 111 are arranged, but the number of seating grooves 111 may be appropriately selected depending on the number of blades 120 and the capacity of the gas turbine engine 1. For example, the number of seating grooves 111 may be 10 or less or 12 or more.

The seating groove 111 has a flat bottom surface to be seated on an outer peripheral surface of the disk 110, and sides of the seating groove 111 may extend from both sides of the bottom surface to supports the dovetail portion122. For example, as shown in FIG. 2, the sides of the seating groove 111 may include a portion extending vertically from both sides of the bottom surface and a portion extending inward from the vertical portion, that is, toward the blade 120. Accordingly, even if the blade 120 inserted into the seating groove 111 rotates at high speed, the dovetail portion 122 is supported by the seating groove 111 and may be prevented from leaving the designated position.

In one embodiment, an end of the seating groove 111 in a radial direction may be disposed between a wing portion 121 and the dovetail portion 122 of the blade 120.

The blade 120 is inserted into the seating groove 111 of the disk 110 and rotates by combustion gas to drive the output shaft 30. The blade 120 may be flat, curved, or bent in a predetermined direction. For example, the blade 120 may have a shape twisted by a predetermined angle about the central axis in a longitudinal direction thereof.

In one embodiment, the blade 120 may include the wing portion 121 and the dovetail portion 122.

As shown in FIG. 2, the wing portion 121 may extend in the longitudinal direction of the blade 120 (or the radial direction of the disk 110). The wing portion 121 rotates the output shaft 30 by directly contacting combustion gas.

The dovetail portion 122 extends downward from the wing portion 121 and is inserted into the seating groove 111. The dovetail portion 122 may have a greater width than the wing portion 121. For example, the dovetail portion 122 may have a portion inclining outward from the bottom of the wing portion 121 to have a gradually increasing width, a portion extending vertically downward from the portion with increased width, and a bottom portion. The dovetail portion 122 may have a shape corresponding to the inner surface of the seating groove 111.

In one embodiment, the bottom surface of the dovetail portion 122 may be spaced apart from the bottom surface of the seating groove 111 while the dovetail portion 122 is inserted into the seating groove 111. More specifically, as shown in the enlarged view of FIG. 2, a free space may be formed on the bottom between the seating groove 111 and the dovetail portion 122. Through this configuration, the blade 120 may be easily seated in the seating groove 111 even if the shape and size of the dovetail portion 122 are somewhat different. In addition, while securing the free space, when the rotor assembly 100 is operated, the blades 120 come into close contact with the seating groove 111 radially outward due to centrifugal force, so that the blades 120 do not shake.

The protective core 130 is disposed between the blade 120 and the disk 110 to prevent the disk 110 and the blade 120 form being damaged that occurs during the operation of the rotor assembly 100. For example, as shown in FIG. 2, the protective core 130 is arranged to surround the dovetail portion 122 of the blade 120, and in this state, may be arranged to contact an inner surface of the disk 110.

In one embodiment, a frontal shape of the protective core 130 may have a polygonal shape, a circular shape, or a combination thereof. For example, as shown in FIG. 3, the protective core 130 may include a bottom surface 131, a support surface 132 extending from the bottom surface 131, and a side surface 133.

The bottom surface 131 is seated on the bottom surface of the seating groove 111 while the protective core 130 is inserted into the seating groove 111. As shown in FIGS. 2 and 3, the bottom surface 131 may have a narrower width than the bottom surface of the seating groove 111. Also, if the blade 120 is inserted into the protective core 130, an end of the dovetail portion 122 may be spaced apart from the bottom surface 131.

The support surface 132 extends obliquely toward an inner wall of the disk 110 on both sides of the bottom surface 131 in a width direction W. As shown in FIGS. 2 and 3, a pair of support surfaces 132 are disposed between the bottom surface 131 and the side surface 133, and are each inclined at a predetermined angle toward the outside of the protective core 130.

In one embodiment, the support surface 132 may support the blade 120. As shown in FIG. 2, if the blade 120 and the protective core 130 are inserted into the seating groove 111, an end of the dovetail portion 122 of the blade 120 is supported by the top of the support surface 132.

The side surface 133 extends vertically from the top of the support surface 132 in a height direction and may contact a side surface of the dovetail portion 122. Also, a cover surface 134 may extend from the top of the side surface 133 to cover an upper surface of the dovetail portion 122. Accordingly, if the blade 120 and the protective core 130 are seated in the seating groove 111, as shown in FIG. 2, the bottom surface 131 of the protective core 130 is disposed to be spaced apart from the bottom surface of the seating groove 111, and a lower end of the dovetail portion 122 is supported on the support surface 132. In addition, the side surface133 and the cover surface 134 are arranged to surround the dovetail portion 122 to distribute a load applied to the disk 110, that is, the seating groove 111, when the blade 120 rotates.

One or more mounting portions 135 may be disposed on the bottom surface 131. As shown in FIGS. 3 and 4, the mounting portion 135 may be a hole or slit formed on the bottom surface 131 in the longitudinal direction L and the width direction W. For example, the mounting portions 135 may be arranged at equal intervals to form a plurality of rows in the longitudinal direction L. Additionally, the plurality of mounting portions 135 may be arranged to be symmetrical with respect to the center of the longitudinal direction L and/or the width direction W.

The weight 140 may be placed in the mounting portion 135 to be detachable. In this way, the center of rotation and the center of gravity of the protective core 130 and the rotor assembly 100 including the protective core 130 are aligned, and thus, allowing the rotor assembly 100 to rotate smoothly. For example, the mounting portion 135 and the weight 140 may each have screw threads that may be coupled to each other. In addition, the mounting portion 135 and the weight 140 may be equipped with various types of known, detachable coupling methods.

Alternatively, the mounting portion 135 and the weight 140 may not be provided with separate coupling methods. That is, as shown in FIG. 2, the mounting portion 135 is formed on the bottom surface 131 of the protective core 130. In addition, even if the rotor assembly 100 rotates, as will be described later, because the mounting portion 135 has a shape in which a cross-sectional area decreases toward an outer side of the disk 110 in a radial direction, that is, in the height direction of the protective core 130, even if a separate coupling method is not provided, the weight 140 may not be separated from the mounting portion 135. In this way, an overall weight of the protective core 130 and the rotor assembly 100 including the weight 140 may be reduced, and the time and cost required for manufacturing may be reduced.

In one embodiment, the mounting portion 135 may have a shape in which a cross-sectional area decreases toward the outer side of the disk 110 in the radial direction, that is, in the height direction of the protective core 130. In other words, the mounting portion 135 may be formed to penetrate the bottom surface 131, and the cross-sectional area thereof may gradually decrease towards inside from an outside of the bottom surface 131.

For example, as shown in FIG. 6, the mounting portion 135 may be composed of a plurality of grooves having different outer diameters and arranged to form a step difference in the height direction thereof. Additionally, the outer diameter of the groove disposed on an outer surface of the bottom surface 131 of the mounting portion 135 may be greater than the outer diameter of the groove disposed on an inner surface of the bottom surface 131.

Likewise, the weight 140 may have a shape corresponding to the mounting portion 135. For example, as shown in FIG. 8, the weight 140 may include a small diameter portion 141 having a diameter D1 and a large diameter portion 142 having a diameter D2 greater than D1.

If the rotor assembly 100 rotates while the weight 140 is inserted into the mounting portion 135, the weight 140 is forced outward in the radial direction of the rotor assembly 100 by centrifugal force. At this time, as described above, because the mounting portion 135 and the weight 140 have a shape in which the cross-sectional area becomes smaller outwardly in a radial direction of the disk 110, even when subjected to centrifugal force, the weight 140 may be prevented from being separated from the mounting portion 135.

In one embodiment, the weight 140 may be inserted into the protective core 130 to balance the weight of the protective core 130 and the rotor assembly 100. More specifically, the rotor assembly 100 rotates while being inserted into the output shaft 30. If the rotation axis of the rotor assembly 100 and the center of gravity are not match, problems such as vibration or rubbing may occur during rotation. In the prior art, after inserting the blade 120 into the disk 110, the center of gravity and the rotation axis are matched by polishing the disk 110. However, damage to the disk 110 inevitably may occur during the polishing process. Also, there is a problem that a new balancing work is needed to perform when replacing the blade 120.

In the rotor assembly 100 according to an embodiment, the rotation axis of the rotor assembly 100 and the center of gravity may be matched without damaging the disk 110 by attaching and detaching the weight 140 to the protective core 130. For example, if the center of gravity of the rotor assembly 100 is biased inward in a thickness direction, the center of gravity may be corrected by mounting the weight 140 on the mounting portion 135 located outside the protective core 130 in the longitudinal direction.

In one embodiment, the weights 140 may have the same or different weights.

FIG. 4 shows a case when six mounting portions 135 are arranged in two rows on the bottom surface of the protective core 130, but the number and position of the mounting portions 135 are not limited thereto. For example, as shown in FIG. 5, a plurality of mounting portions 135A may be arranged in a width direction center line of the bottom surface of the protective core 130A, and a plurality of mounting portions 135A may be arranged in a longitudinal center line.

In one embodiment, the mounting portion 135A may not be disposed in a region where the width direction center line and the longitudinal center line intersect. More specifically, if a virtual triangle is drawn by extending any three mounting portions 135A among the plurality of mounting portions 135A, the remaining mounting portions 135A may be placed outside the virtual triangle. For example, as shown in FIG. 5, four mounting portions 135A are formed, and each may be disposed on the width direction center line and the longitudinal center line so as to be symmetrical. Through this arrangement, the position of the entire center of gravity of the rotor assembly 100 may be significantly changed by attaching or detaching any one mounting portion 135A.

In another embodiment, the mounting portions 135A may be replaced asymmetrically. For example, the mounting portions 135A may be disposed on only one side or disposed in greater numbers on one side based on the width direction center line and/or the longitudinal center line.

In another embodiment, the mounting portion 135B may have a cone or pyramid shape. For example, as shown in FIGS. 7 and 9, the weight 140B may have a square pyramid shape, and the mounting portion 135B may also have a corresponding shape. Alternatively, in another embodiment, the weight 140B may have various pyramidal shapes, such as a triangular pyramid or a pentagonal pyramid. Alternatively, the weight 140B may have a cone shape.

Through this configuration, in the rotor assembly 100 according to an embodiment of the present disclosure, the protective core 130 is arranged between the blades 120 and the disk 110, and thus, damage occurring to the disk 110 and blade 120 during operation may be minimized. Additionally, by attaching and detaching the weight 140 from the protective core 130, the rotation axis of the rotor assembly 100 and the center of gravity may be easily aligned without the process of polishing the disk 110.

Figure 10:
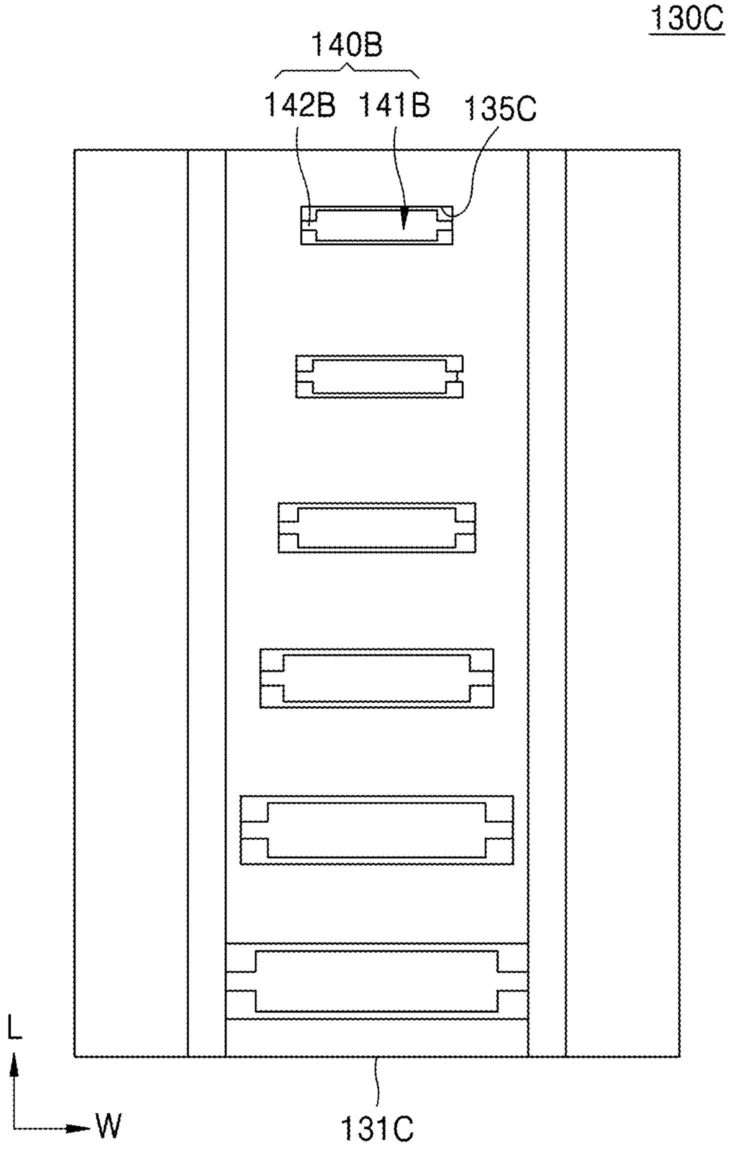
FIG. 10 shows a protective core and a weight according to another embodiment of the present disclosure.

FIG. 10 shows a protective core 130C and a weight 140B according to another embodiment of the present disclosure. More specifically, FIG. 10 shows the protective core 130C viewed from the bottom.

As shown in FIG. 10, a plurality of mounting portions 135C may be formed on a bottom surface 131C of the protective core 130C. Additionally, the mounting portion 135C may have a slit shape. For example, unlike the hole-shaped mounting portions 135, 135A, and 135B according to the previously described embodiment, the mounting portion 135C may be formed to be long in one direction on the bottom surface 131C. Additionally, the mounting portion 135C may have a uniform width or diameter in a thickness direction of the bottom surface 131C.

In one embodiment, the plurality of mounting portions 135C may have different sizes and/or shapes. For example, the mounting portion 135C may have a rectangular shape extending long in a width direction of the bottom surface 131C, and a plurality of mounting portions 135C may be arranged in a length direction of the bottom surface 131C. Also, the plurality of mounting portions 135C may gradually increase or decrease in size in the longitudinal direction of the bottom surface 131C. Also, the weight 140B may also have a corresponding size and weight. Through this configuration, if the center of gravity of the rotor assembly 100 is biased to one side, the center of gravity of the rotor assembly 100 may be more easily adjusted by removing the largest (or heaviest) weight 140B.

The weight 140B may include a body 141B and a plurality of support protrusions 142B that protrude from the body 141B and are coupled to an inner surface of the mounting portion 135C. For example, as shown in FIG. 10, the body 141B may have a shape corresponding to the shape of the mounting portion 135C to be inserted thereto, and in one embodiment, may have a rectangular parallelepiped shape. Additionally, the support protrusions 142B may protrude on both sides of the body 141B, for example, on both sides in the width direction of the body 141B. The pair of support protrusions 142B may be detachably coupled to an inner surface of the mounting portion 135C through screw coupling or the like.

In one embodiment, the body 141B may be arranged to be spaced apart from the inner surface of the mounting portion 135C. As shown in FIG. 10, if the weight 140B is coupled to the mounting portion 135C, both longitudinal sides of the bottom surface 131C may be spaced apart from the inner surface of the mounting portion 135C by a predetermined distance. Through the corresponding gap, an operation of attaching and detaching of the weight 140B from the mounting portion 135C may be performed.

Figure 11:
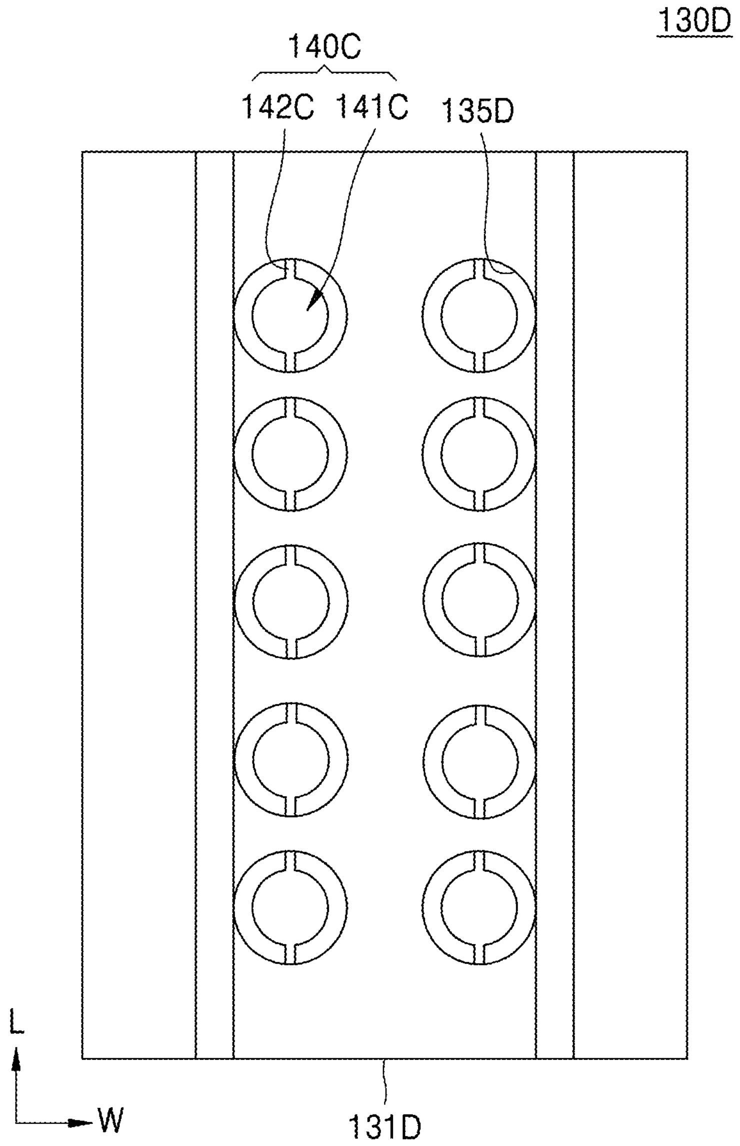
FIG. 11 shows a protective core and a weight according to another embodiment of the present disclosure.

FIG. 11 shows a protective core 130D and a weight 140C according to another embodiment of the present disclosure. More specifically, FIG. 11 shows the protective core 130D viewed from the bottom.

As shown in FIG. 11, a plurality of mounting portions 135D may be formed on a bottom surface 131D of the protective core 130D. Also, the mounting portion 135D may have a hole shape. Also, the mounting portion 135D may have a uniform width or diameter in a thickness direction of the bottom surface 131D.

The weight 140C may include a body 141C and a plurality of support protrusions 142C that protrude from the body 141C and are coupled to an inner surface of the mounting portion 135D. For example, as shown in FIG. 11, the body 141C may be circular to be inserted into the mounting portion 135D. Also, the support protrusion 142C may protrude on both sides of the body 141C, for example, to a radial outside of the body 141C. The pair of support protrusions 142C may be detachably coupled to the inner surface of the mounting portion 135D through screw coupling or the like.

In one embodiment, the body 141C may be arranged to be spaced apart from the inner surface of the mounting portion 135D. As shown in FIG. 11, if the weight 140C is coupled to the mounting portion 135D, both longitudinal surfaces of the bottom surface 131D may be spaced apart from the inner surface of the mounting portion 135D by a predetermined distance. Through the corresponding gap, the weight 140C may be detached from the mounting portion 135D.

Although the present disclosure has been described with reference to the embodiments shown in the drawings, these are merely examples. It will be understood by those of ordinary skill in the art that various changes in form and details may be made therein without departing from the spirit and scope of the present disclosure. Accordingly, the scope of the present disclosure is defined not by the detailed description of the present disclosure but by the appended claims.

The specific technical content described in the embodiment is an example and does not limit the technical scope of the embodiment. In order to describe the present disclosure concisely and clearly, descriptions of conventional general techniques and configurations may be omitted. In addition, connections or connection members of lines between components shown in the drawings illustrate functional connections and/or physical or circuit connections, and the connections or connection members may be represented by replaceable or additional various functional connections, physical connections, or circuit connections in an actual apparatus. Additionally, if there is no specific mention such as "essential," "important," etc., it may not be a necessary component for the application of the present disclosure.

The term "above" and similar directional terms may be applied to both singular and plural unless otherwise specified. In addition, if the term "range" is described, it includes an individual value belonging to the range (unless otherwise described), and in the detailed description, it is equal to describe an individual value that constitutes the "range". Also, with respect to operations that constitute a method, the operations may be performed in any appropriate sequence unless the sequence of operations is clearly described or unless the context clearly indicates otherwise. The operations may not necessarily be performed in the order of sequence. All examples or example terms (for example, etc.) are simply used to explain in detail the technical scope of the present disclosure, and thus, the scope of the present disclosure is not limited by the examples or the example terms as long as it is not defined by the claims. Also, it should be understood by those of ordinary skill in the art that the present disclosure is configured according to the design conditions and facts within the claims to which various modifications, combination, and revisions may be added or within a scope of an equivalent product.

INDUSTRIAL APPLICABILITY

The present disclosure may be used in rotor assembly-related industries.

The invention claimed is:

1. A rotor assembly comprising:

a disk inserted into a rotating shaft and having a plurality of seating grooves in a circumferential direction;

a plurality of blades inserted into the plurality of seating grooves; and a protective core disposed between the plurality of blades and the disk, having a plurality of mounting portions on one surface, and having a plurality of weights that are attachable to and detachable from the plurality of mounting portions, wherein the plurality of weights have different weights from each other.

2. The rotor assembly of claim 1, wherein the plurality of mounting portions are formed on a bottom surface of the protective core and have cross-sectional areas that decrease outwardly in a radial direction of the disk.

3. The rotor assembly of claim 2, wherein each of the plurality of mounting portion is configured of a plurality of grooves having different outer diameters and arranged to form a step difference in a height direction thereof.

4. The rotor assembly of claim 2, wherein the plurality of mounting portions are arranged at equal intervals to form a plurality of rows in a longitudinal direction thereof.

5. The rotor assembly of claim 2, wherein the plurality of mounting portions are disposed on a longitudinal center line and a width direction center line of the bottom surface of the protective core.

6. The rotor assembly of claim 2, wherein each of the plurality of mounting portions has a cone or pyramid shape.

7. The rotor assembly of claim 1, wherein a bottom surface of the protective core is in contact with an inner bottom surface of the disk, and portions extending from both sides of the bottom surface in a width direction extend between the plurality of blades and the disk.

8. The rotor assembly of claim 7, wherein each of the plurality of blades includes a wing portion extending in a longitudinal direction thereof, and a dovetail portion extending from the wing portion, inserted into a seating groove and having a width greater than that of the wing portion, the protective core includes a pair of support surfaces extending obliquely toward an inner wall of the disk on both sides of the bottom surface in the width direction, and a lower end of the dovetail portion is supported on the pair of support surfaces.

9. The rotor assembly of claim 1, wherein each of the plurality of weights includes a body and a plurality of support protrusions that protrude from the body and are coupled to inner surfaces of the plurality of mounting portions.

10. The rotor assembly of claim 9, wherein each of the mounting portions has a slit shape formed on the bottom surface of the protective core, and a pair of support protrusions of each of the plurality of weight are coupled to a pair of inner surfaces of each of the plurality of mounting portions, and the body of each of the plurality of weights is arranged to be spaced apart from an inner surface of each of the plurality of mounting portions.

11. The rotor assembly of claim 10, wherein each of the plurality of weights has a rectangular parallelepiped shape extending in a width direction of the disk.

12. The rotor assembly of claim 9, wherein each of the plurality of mounting portions has a hole shape formed on a bottom surface of the protective core, and a pair of support protrusions of each of the plurality of weights are coupled to a pair of inner surfaces of each of the plurality of mounting portions, and the body of each of the plurality of weights is arranged to be spaced apart from an inner surface of each of the plurality of mounting portions.

13. The rotor assembly of claim 9, wherein the plurality of mounting portions gradually increase in size toward one side of the protective core in a longitudinal direction.

14. A gas turbine engine comprising a compressor configured to compress a working fluid, a combustion chamber in which the compressed working fluid and fuel are burnt, and a turbine configured to generate power through an output shaft and including a plurality of rotor assemblies, wherein each of the plurality of rotor assemblies includes:

a disk inserted into a rotating shaft and having a plurality of seating grooves in a circumferential direction;

a plurality of blades inserted into the plurality of seating grooves; and a protective core disposed between the plurality of blades and the disk, having a plurality of mounting portions on one surface, and having a plurality of weights detachable from the plurality of mounting portions, wherein the plurality of weights have different weights from each other.

* * * * *